United States Patent
Hepworth et al.

(10) Patent No.: US 8,215,554 B2
(45) Date of Patent: *Jul. 10, 2012

(54) GRAPHICAL CODE READERS FOR BALANCING DECODE CAPABILITY AND SPEED BY USING IMAGE BRIGHTNESS INFORMATION

(75) Inventors: Paul Hepworth, Riverton, UT (US); George Powell, Sandy, UT (US); Ryan Hoobler, Salt Lake City, UT (US)

(73) Assignee: The Code Corporation, Bluffdale, UT (US)

( * ) Notice: Subject to any disclaimer, the term of this patent is extended or adjusted under 35 U.S.C. 154(b) by 598 days.

This patent is subject to a terminal disclaimer.

(21) Appl. No.: 11/756,491

(22) Filed: May 31, 2007

(65) Prior Publication Data

US 2008/0296379 A1    Dec. 4, 2008

(51) Int. Cl.
*G06K 7/10*    (2006.01)
(52) U.S. Cl. ........................ 235/455; 235/454
(58) Field of Classification Search ........... 235/455, 235/462.32, 462.06, 454, 491
See application file for complete search history.

(56) References Cited

U.S. PATENT DOCUMENTS

| | | | | |
|---|---|---|---|---|
| 7,548,270 B2* | 6/2009 | Kong et al. | ............ | 348/366 |
| 8,016,197 B2* | 9/2011 | Furuyama et al. | ......... | 235/462.1 |
| 2002/0070278 A1* | 6/2002 | Hung et al. | ............. | 235/472.01 |
| 2004/0262393 A1 | 12/2004 | Hara et al. | | |
| 2005/0052544 A1* | 3/2005 | Tsai | ......................... | 348/223.1 |
| 2005/0103865 A1 | 5/2005 | Zhu et al. | | |
| 2005/0276458 A1 | 12/2005 | Jones et al. | | |
| 2005/0278239 A1 | 12/2005 | Jones et al. | | |
| 2006/0010071 A1 | 1/2006 | Jones et al. | | |
| 2006/0027657 A1 | 2/2006 | Ninnink et al. | | |
| 2006/0072154 A1* | 4/2006 | Kim | ........................... | 358/1.15 |
| 2006/0091214 A1* | 5/2006 | Hyde et al. | .................... | 235/454 |
| 2006/0215920 A1 | 9/2006 | Yokose | | |
| 2006/0231626 A1* | 10/2006 | Pan et al. | ..................... | 235/454 |
| 2008/0259007 A1* | 10/2008 | Chiu et al. | ...................... | 345/77 |

OTHER PUBLICATIONS

Office Action for U.S. Appl. No. 11/358,459 dated May 4, 2009.
U.S. Appl. No. 11/358,459, filed Feb. 21, 2006, Powell et al.
Office Action issued for U.S. Appl. No. 11/358,459 on Apr. 7, 2008.
Office Action issued for U.S. Appl. No. 11/358,459 on Oct. 14, 2008.
Office Action for U.S. Appl. No. 11/358,459, dated Nov. 13, 2009.
Notice of Allowance for U.S. Appl. No. 11/358,459, dated Aug. 17, 2010.

* cited by examiner

*Primary Examiner* — Edwyn Labaze

(57) ABSTRACT

A method for adaptively varying resolutions of captured images may include capturing images and processing the captured images. The method may also include determining brightness information about the captured images. The method may also include varying the resolutions of the captured images based on the brightness information that is determined about the captured images. The method may also include determining intended brightness information corresponding to the captured images, and the resolutions of the captured images may be varied based on the intended brightness information as well as the brightness information.

12 Claims, 9 Drawing Sheets

| GAIN | EXPOSURE | UPPER THRESHOLD | LOWER THRESHOLD |
|---|---|---|---|
| 1st Gain Setting *538* | 1st Exposure Setting *540* | 1st Upper Threshold *542* | 1st Lower Threshold *544* |
| 2nd Gain Setting | 2nd Exposure Setting | 2nd Upper Threshold | 2nd Lower Threshold |
| 3rd Gain Setting | 3rd Exposure Setting | 3rd Upper Threshold | 3rd Lower Threshold |

FIG. 5

GRAPHICAL CODE READERS FOR BALANCING DECODE CAPABILITY AND SPEED BY USING IMAGE BRIGHTNESS INFORMATION

TECHNICAL FIELD

The present disclosure relates generally to graphical code readers. More specifically, the present disclosure relates to the use of graphical code readers to read and decode graphical codes.

BACKGROUND

A machine-readable graphical code ("graphical code") is a graphical representation of information that consists of multiple graphical code elements having different light reflective or light emissive properties. Examples of different types of graphical codes include bar codes, data matrix codes, Maxi-Codes, and so forth. Graphical codes and graphical code readers have become widely used in many commercial environments, such as point-of-sale stations in retail stores and supermarkets, inventory and document tracking, and the like.

Devices for identifying or extracting information from graphical codes are generally referred to as graphical code readers. Image-based graphical code readers typically include one or more light sources for illuminating a graphical code. Light is reflected from the graphical code toward the graphical code reader. A lens within the graphical code reader focuses an image of the graphical code onto an image sensor. Pixels within the image sensor are read electronically to provide a two-dimensional array of image data corresponding to the graphical code. A decoder then processes the image data and extracts the information contained in the graphical code.

Different types of graphical codes include different types of graphical code elements. For example, bar codes include variable-width rectangular bars. Data matrix codes include square data modules. MaxiCodes include a central finder pattern and a grid of hexagons surrounding the central finder pattern.

Different types of graphical codes may vary in size. For example, bar codes are typically larger in size than data matrix codes. The graphical code elements within different types of graphical codes may also vary in size. For example, the variable-width rectangular bars in bar codes are typically larger than the square data modules in data matrix codes or the hexagons in MaxiCodes.

As indicated above, the present disclosure relates generally to graphical code readers. More specifically, the present disclosure relates to the use of graphical code readers to read and decode graphical codes.

BRIEF DESCRIPTION OF THE DRAWINGS

FIG. 5 illustrates resolution selection rules that may be used by the graphical code reader of FIG. 1;

DETAILED DESCRIPTION

Figure 1:
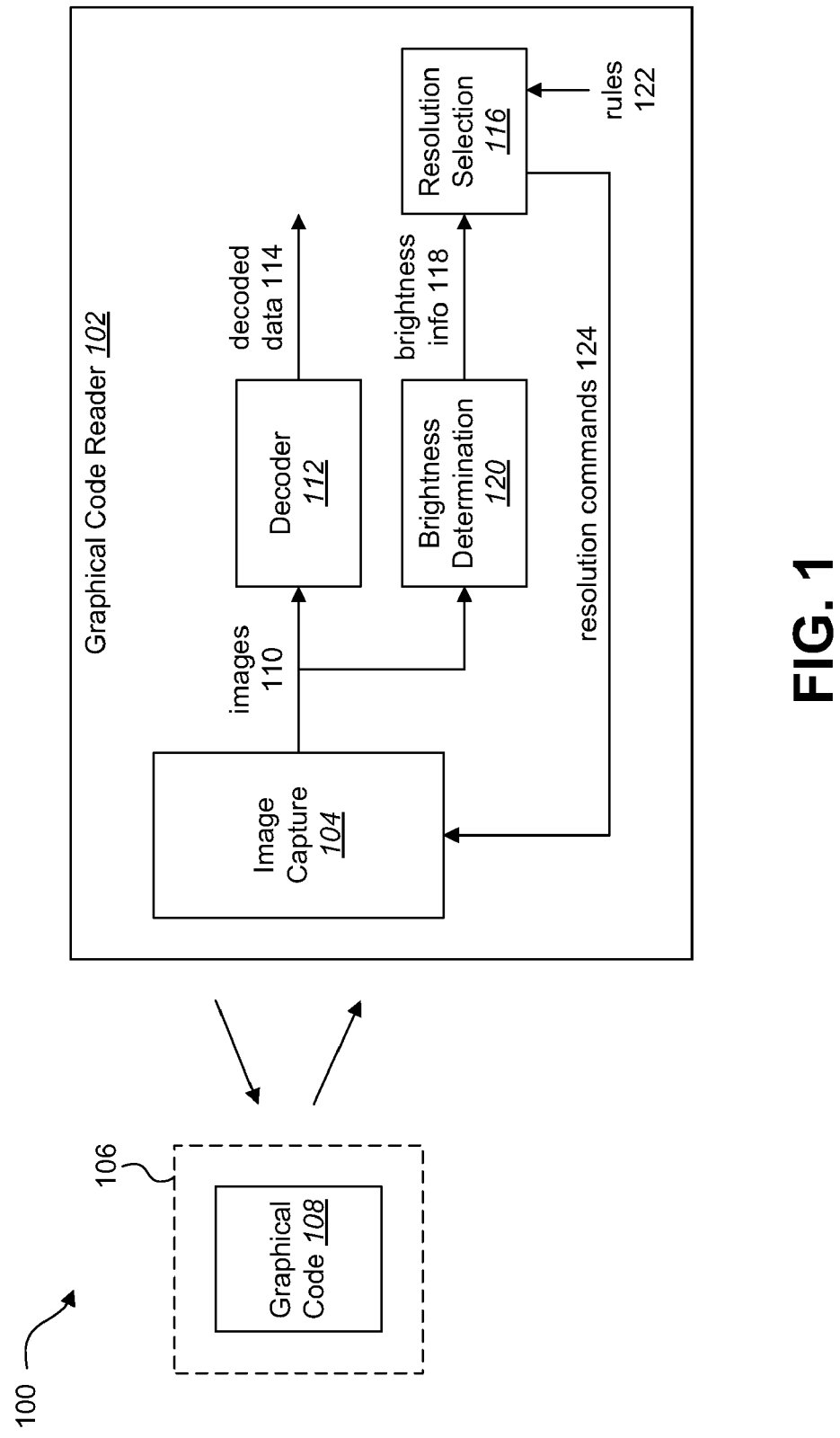
FIG. 1 illustrates a graphical code reader that adaptively varies resolutions of captured images.

As used herein, the term "multi-resolution" graphical code reader refers to a graphical code reader that is capable of capturing images at more than one resolution. The term "low resolution" refers to the lowest possible resolution at which a multi-resolution reader may capture an image. The term "high resolution" refers to the highest possible resolution at which a multi-resolution reader may capture an image. A multi-resolution reader may also be capable of capturing one or more intermediate resolution images, i.e., images whose resolution is somewhere between that of a low-resolution image and a high-resolution image.

It generally requires less time to capture and decode low-resolution images than it requires to capture and decode high-resolution images of the same area (i.e., field of view). For example, decoding time is roughly proportional to the number of pixels that are being processed. Therefore, if a low-resolution image contains ¼ as many pixels as a high-resolution image, then a low-resolution image may be decoded in about ¼ the time as a high-resolution image. Accordingly, to achieve faster image transfer and processing, it is preferable for a multi-resolution graphical code reader to capture low-resolution images whenever they may be used to decode the kinds of graphical codes that are being read. However, low-resolution images may not include sufficient detail to enable successful decoding of high-density codes (i.e., codes with very small features). For example, in a low-resolution image, the elements of a high-density code may blur together. Accordingly, higher resolution images may sometimes be needed in order to successfully decode high-density codes.

The present disclosure relates generally to ways that a multi-resolution graphical code reader may be configured in order to balance the increased decode capability that is provided by capturing and processing high-resolution images and the increased speed that is achieved by capturing and processing low-resolution images. More specifically, the present disclosure relates to ways that the resolutions of captured images may be adaptively changed based on the environment in which the graphical code reader is being used.

The amount of resolution that a graphical code reader requires to read a graphical code may be inversely proportional to the distance between the graphical code reader and the graphical code. Thus, if a graphical code reader is positioned relatively close to a graphical code, the graphical code reader may be capable of reading the graphical code at a lower resolution than if the graphical code reader were positioned farther away from the graphical code.

Typically, the brightness of an image that includes a graphical code is inversely proportional to the distance between the graphical code and the graphical code reader that was used to capture the image. Thus, information about the distance between a graphical code reader and a graphical code may be inferred from the brightness of an image of the graphical code that is captured by the graphical code reader. If the image is relatively bright, this may be interpreted to mean that the graphical code reader is positioned relatively close to the graphical code. Conversely, if the image is relatively dark, this may be interpreted to mean that the graphical code reader is positioned relatively far away from the graphical code.

A graphical code reader that adaptively varies resolutions of captured images is disclosed. The graphical code reader may include an image capture component that is configured to capture images at different resolutions. The graphical code reader may also include a processor, and memory in electronic communication with the processor. The graphical code reader may also include instructions stored in the memory. The instructions may be executable to capture the images. The instructions may also be executable to process the captured images. The instructions may also be executable to determine brightness information about the captured images. The instructions may also be executable to vary the resolutions of the captured images based on the brightness information that is determined about the captured images.

Varying the resolutions of the captured images based on the brightness information may include decreasing the current resolution of the graphical code reader if the brightness of a most recently captured image exceeds an upper threshold. In addition, varying the resolutions of the captured images based on the brightness information may include increasing the current resolution of the graphical code reader if the brightness of a most recently captured image is less than a lower threshold.

The instructions may also be executable to determine intended brightness information corresponding to the captured images. The resolutions of the captured images may be varied based on the intended brightness information as well as the brightness information.

Varying the resolutions of the captured images based on the brightness information and the intended brightness information may include decreasing the current resolution of the graphical code reader if the brightness of a most recently captured image relative to an intended brightness that was used for the most recently captured image exceeds an upper threshold. In addition, varying the resolutions of the captured images based on the brightness information and the intended brightness information may include increasing the current resolution of the graphical code reader if the brightness of a most recently captured image relative to an intended brightness that was used for the most recently captured image is less than a lower threshold.

The captured images may have substantially the same field of view. The resolutions of the captured images may be varied automatically. Varying the resolutions of the captured images may include evaluating predefined resolution selection rules based on the brightness information.

A method for adaptively varying resolutions of captured images is also disclosed. The method may include capturing images. The method may also include processing the captured images. The method may also include determining brightness information about the captured images. The method may also include varying the resolutions of the captured images based on the brightness information that is determined about the captured images.

The method may also include determining intended brightness information corresponding to the captured images. The resolutions of the captured images may be varied based on the intended brightness information as well as the brightness information.

Another embodiment of a graphical code reader that adaptively varies resolutions of captured images is also disclosed. The graphical code reader may include means for capturing images. The graphical code reader may also include means for processing the captured images. The graphical code reader may also include means for determining brightness information about the captured images. The graphical code reader may also include means for varying the resolutions of the captured images based on the brightness information that is determined about the captured images.

The graphical code reader may also include means for determining intended brightness information corresponding to the captured images. The resolutions of the captured images may be varied based on the intended brightness information as well as the brightness information.

Several exemplary embodiments are now described with reference to the Figures. This detailed description of several exemplary embodiments, as illustrated in the Figures, is not intended to limit the scope of the claims.

FIG. 1 illustrates a graphical code reader 102 that adaptively varies resolutions of captured images. The graphical code reader 102 is shown with an image capture component 104. The image capture component 104 may be configured to capture images 110 of objects located within a target area 106. When the graphical code reader 102 is positioned so that a graphical code 108 is located within the target area 106, one or more images 110 captured by the image capture component 104 may include the graphical code 108.

The graphical code reader 102 is also shown with a decoder 112. The images 110 that are captured by the image capture component 104 may be provided to the decoder 112 for processing. The decoder 112 may process each image 110 by attempting to locate a graphical code 108 within the image 110, and if a graphical code 108 is located, attempting to decode the graphical code 108. If a graphical code 108 is successfully decoded, the decoder 112 may output decoded data 114.

The graphical code reader 102 that is shown in FIG. 1 may be a multi-resolution graphical code reader 102. In other words, the image capture component 104 of the graphical code reader 102 may be capable of capturing images 110 at more than one resolution. The images 110 that are captured by the graphical code reader 102 may have substantially the same field of view.

The graphical code reader 102 may adaptively vary the resolutions of the images 110 that it captures based on the environment in which the graphical code reader 102 is being used. More specifically, the graphical code reader 102 may vary the resolutions of the captured images 110 based on brightness information 118 about the captured images 110.

The graphical code reader 102 is shown with a brightness determination component 120. The brightness determination component 120 may determine brightness information 118 about the captured images 110.

The graphical code reader 102 is also shown with a resolution selection component 116. The resolution selection component 116 may select the resolutions of the images 110 that are captured by the image capture component 104. The resolution selection component 116 may select the resolutions of the captured images 110 by evaluating predefined rules 122 based on the brightness information 118 that is provided by the brightness determination component 120. The rules 122 may be referred to as resolution selection rules 122. The resolution selection rules 122 may define how the resolutions of the captured images 110 are selected based on the brightness information 118. The resolution selection component 116 may provide resolution commands 124 to the image capture component 104.

Figure 2:
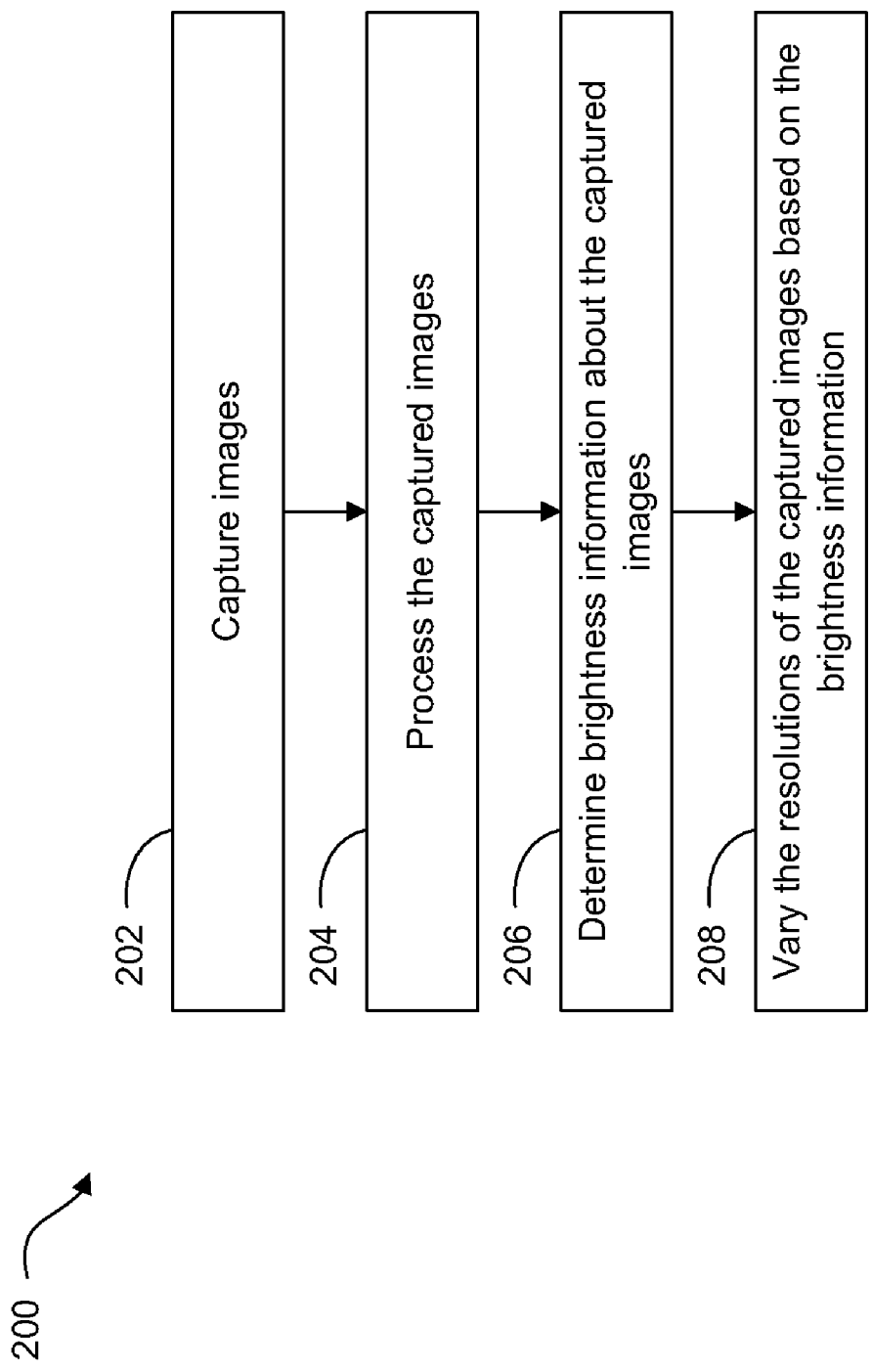
FIG. 2 illustrates a method for adaptively varying the resolutions of captured images that may be implemented by the graphical code reader of FIG. 1.

FIG. 2 illustrates a method 200 for adaptively varying the resolutions of captured images 110. The method 200 may be implemented by the graphical code reader 102 of FIG. 1. The method 200 may include capturing 202 images 110 and processing 204 the captured images 110. The method 200 may also include determining 206 brightness information 118 about the captured images 110. The method 200 may also include varying 208 the resolutions of the captured images 110 based on the brightness information 118. The resolutions of the captured images 110 may be varied automatically.

Figure 3:
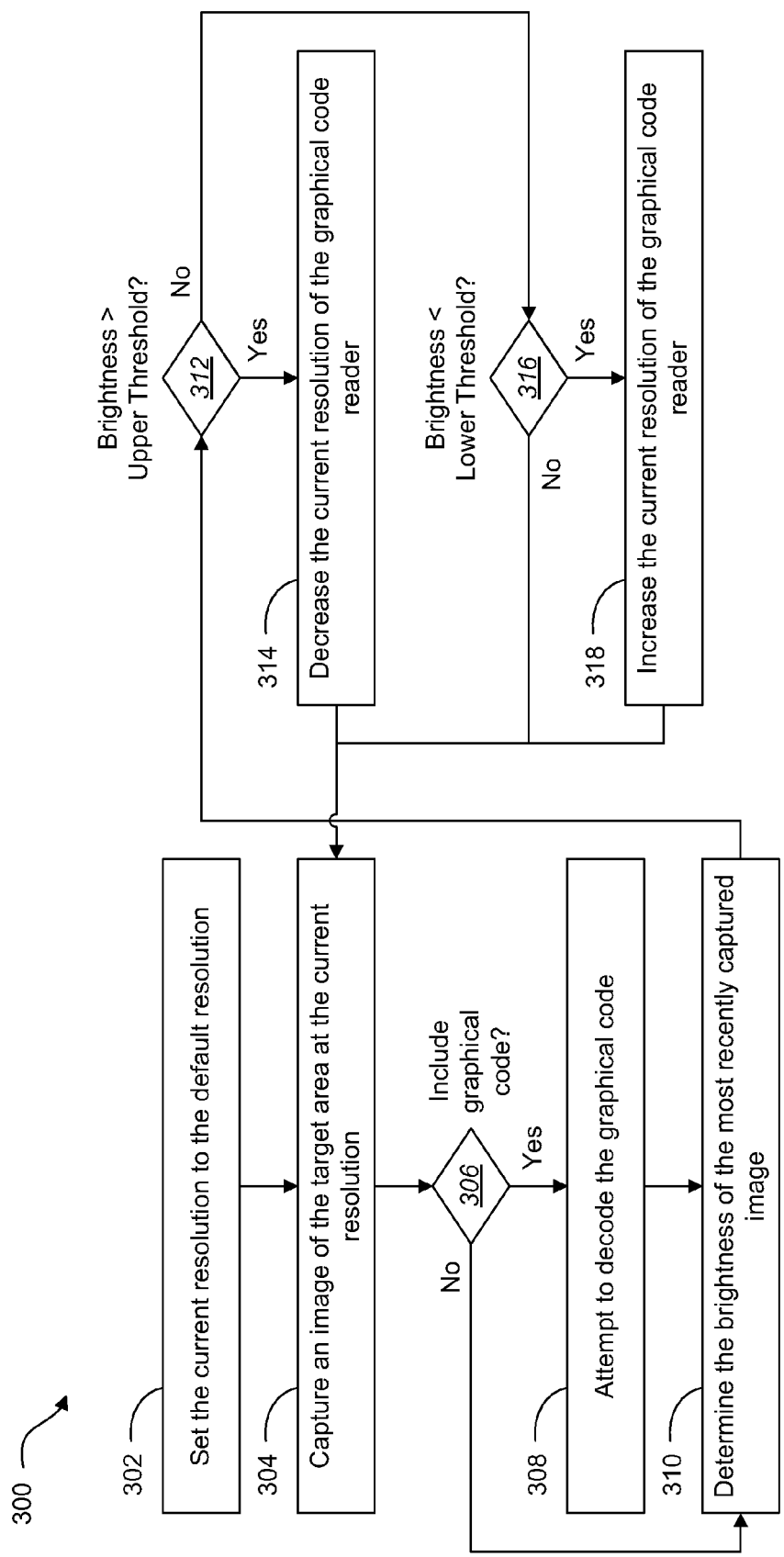
FIG. 3 illustrates another method for adaptively varying the resolutions of captured images that may be implemented by the graphical code reader of FIG. 1.

FIG. 3 illustrates another method 300 for adaptively varying the resolutions of captured images 110. The method 300 shown in FIG. 3 is an example of an implementation of the method 200 shown in FIG. 2. The method 300 may be implemented by the graphical code reader 102 of FIG. 1. The method 300 may be implemented in response to user input to read a graphical code 108.

The method 300 may include setting 302 the current resolution of the graphical code reader 102 to the default resolution. The method 300 may also include capturing 304 an image 110 of the target area 106 at the current resolution. The method 300 may also include determining 306 whether the captured image 110 includes a graphical code 108. If it is determined 306 that the captured image 110 includes a graphical code 108, then the method 300 may also include attempting 308 to decode the graphical code 108.

The method 300 may also include determining 310 the brightness of the most recently captured image 110. When the brightness of the most recently captured image 110 is determined 310, then the method 300 may also include determining 312 whether the brightness of the most recently captured image 110 exceeds an upper threshold. If it is determined 312 that the brightness of the most recently captured image 110 exceeds the upper threshold, this may be interpreted to mean that the graphical code reader 102 is positioned near the graphical code 108. As indicated above, the amount of resolution that a graphical code reader 102 requires to read a graphical code 108 may be inversely proportional to the distance between the graphical code reader 102 and the graphical code 108. Thus, in response to determining 312 that the brightness of the most recently captured image 110 exceeds the upper threshold, the method 300 may include decreasing 314 the current resolution of the graphical code reader 102. The resolution of the graphical code reader 102 may be decreased to the lowest possible resolution at which the graphical code reader 102 is capable of capturing images 110. Alternatively, the resolution of the graphical code reader 102 may be decreased to a resolution that is not the lowest possible resolution at which the graphical code reader 102 is capable of capturing images 110, but that is still lower than the current resolution. If the current resolution of the graphical code reader 102 is already the lowest possible resolution at which the graphical code reader 102 is capable of capturing images 110, then the resolution may remain unchanged. The method 300 may then return to capturing 304 an image 110 of the target area 106 at the current resolution. The method 300 may then proceed as described above.

If it is determined 312 that the brightness of the most recently captured image 110 does not exceed the upper threshold, then the method 300 may include determining 316 whether the brightness of the most recently captured image 110 is less than a lower threshold. If it is determined 316 that the brightness of the most recently captured image 110 is less than the lower threshold, this may be interpreted to mean that the graphical code reader 102 is positioned relatively far away from the graphical code 108. Thus, in response to determining 316 that the brightness of the most recently captured image 110 is less than the lower threshold, the method 300 may include increasing 318 the current resolution of the graphical code reader 102. The resolution of the graphical code reader 102 may be increased to the highest possible resolution at which the graphical code reader 102 is capable of capturing images 110. Alternatively, the resolution of the graphical code reader 102 may be increased to a resolution that is not the highest possible resolution at which the graphical code reader 102 is capable of capturing images 110, but that is still higher than the current resolution. If the current resolution of the graphical code reader 102 is already the highest possible resolution at which the graphical code reader 102 is capable of capturing images 110, then the resolution may remain unchanged. The method 300 may then return to capturing 304 an image 110 of the target area 106 at the current resolution. The method 300 may then proceed as described above.

If it is determined 316 that the brightness of the most recently captured image 110 is not less than the lower threshold, then the method 300 may return to capturing 304 an image 110 of the target area 106 at the current resolution without changing the current resolution. In other words, the next image 110 may be captured at the same resolution as the most recently captured image 110.

Figure 4:
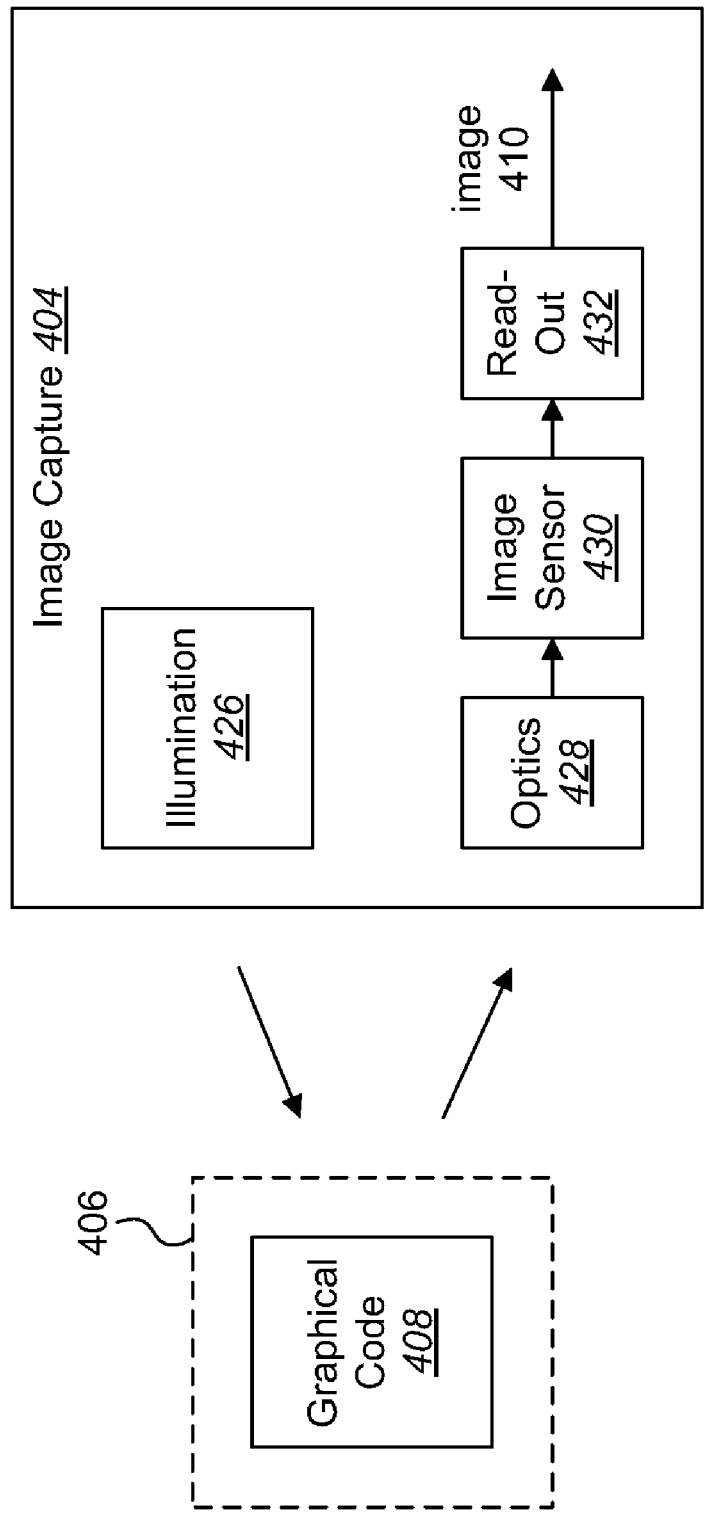
FIG. 4 illustrates an image capture component that may be used in the graphical code reader of FIG. 1.

FIG. 4 illustrates an image capture component 404. The image capture component 404 that is shown in FIG. 4 may be used as the image capture component 104 in the graphical code reader 102 that is shown in FIG. 1.

The image capture component 404 is shown with an illumination component 426, optics 428, an image sensor 430 and a read-out component 432. In operation, the illumination component 426 may be used to illuminate the target area 406, which in FIG. 4 is shown as including a graphical code 408. Light may be reflected from the graphical code 408 toward the optics 428. The optics 428, which may include one or more lenses, may focus the reflected light onto the image sensor 430. The read-out component 432 may read the pixels within the image sensor 430 to provide an image 410 of the graphical code 408, which may be a two-dimensional array of image data.

FIG. 5 illustrates resolution selection rules 522. The resolution selection rules 522 that are shown in FIG. 5 may be used as the resolution selection rules 122 that are evaluated by the resolution selection component 116 in the graphical code reader 102 of FIG. 1.

As discussed above in relation to FIG. 3, the graphical code reader 102 may determine 312 whether the brightness of the most recently captured image 110 exceeds an upper threshold. The graphical code reader 102 may also determine 316 whether the brightness of the most recently captured image 110 is less than a lower threshold. In the resolution selection rules 522 that are shown in FIG. 5, different groups 534 of settings for the graphical code reader 102 are shown associated with different sets 536 of values for the upper threshold and the lower threshold. For example, a first group 534 of settings includes a first gain setting 538 and a first exposure setting 540. The first group 534 of settings is shown associated with a set 536 of threshold values that includes a first upper threshold value 542 and a first lower threshold value 544.

When a determination is being made about whether the brightness of the most recently captured image 110 exceeds an upper threshold, the upper threshold value that matches the current settings of the graphical code reader 102 may be used. Similarly, when a determination is being made about whether the brightness of the most recently captured image 110 is less than a lower threshold, the lower threshold value that matches the current settings of the graphical code reader 102 may be used.

In FIG. 5, two different types of settings for the graphical code reader 102 are shown, namely a gain setting and an exposure setting. However, other types of settings for the graphical code reader 102 may be used instead of or in addition to the gain setting and the exposure setting.

Figure 6:
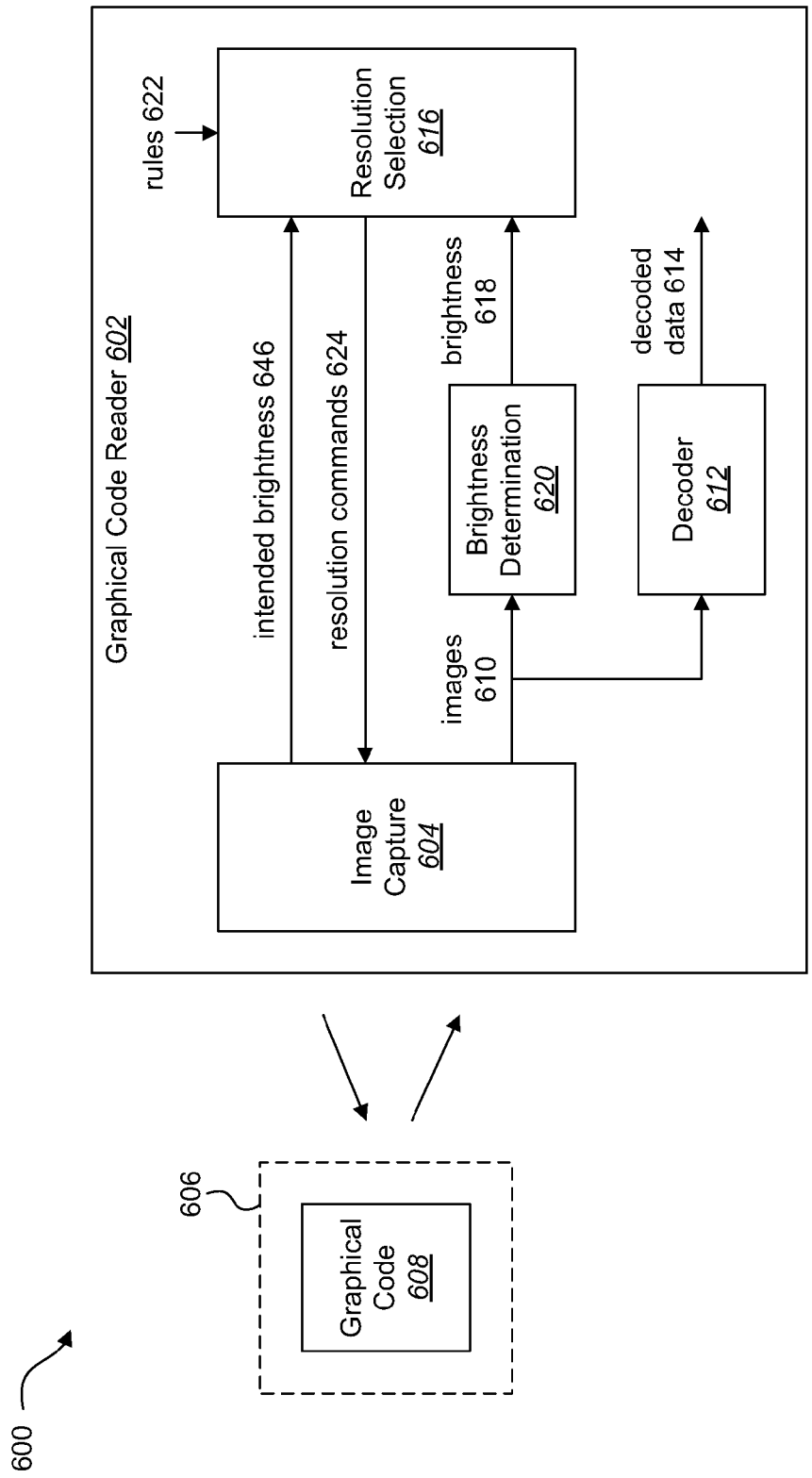
FIG. 6 illustrates another graphical code reader that adaptively varies resolutions of captured images.

FIG. 6 illustrates another graphical code reader 602 that adaptively varies resolutions of captured images. The graphical code reader 602 is shown with an image capture component 604. The image capture component 604 may be configured to capture images 610 of objects located within a target area 606. When the graphical code reader 602 is positioned so that a graphical code 608 is located within the target area 606, one or more images 610 captured by the image capture component 604 may include the graphical code 608.

The graphical code reader 602 is also shown with a decoder 612. The images 610 that are captured by the image capture component 604 may be provided to the decoder 612 for processing. The decoder 612 may process each image 610 by attempting to locate a graphical code 608 within the image 610, and if a graphical code 608 is located, attempting to decode the graphical code 608. If a graphical code 608 is successfully decoded, the decoder 612 may output decoded data 614.

The graphical code reader 602 that is shown in FIG. 6 may be a multi-resolution graphical code reader 602. In other words, the image capture component 604 of the graphical code reader 602 may be capable of capturing images 610 at more than one resolution. The images 610 that are captured by the graphical code reader 602 may have substantially the same field of view.

The graphical code reader 602 may adaptively vary the resolutions of the images 610 that it captures based on the environment in which the graphical code reader 602 is being used. The graphical code reader 602 may vary the resolutions of the captured images 610 based on brightness information 618 about the captured images 610, and also based on information 646 about the intended brightness of the captured images 610. The intended brightness of a particular image 610 may be a measure of the level of brightness that the image 610 would be expected to have based on the illumination level, gain factor, and exposure time that were used for capturing the image 610. Thus, the intended brightness of a particular image 610 may depend on the illumination level, gain factor, and exposure time that were used for capturing the image 610. For example, the intended brightness may be the product of these factors. The illumination level, gain factor, and exposure time that are used for capturing an image 610 may be determined dynamically according to an automatic brightness control algorithm.

The graphical code reader 602 is shown with a brightness determination component 620. The brightness determination component 620 may determine brightness information 618 about the captured images 610. In addition, the image capture component 604 is shown providing information 646 about the intended brightness of the captured images 610.

The graphical code reader 602 is also shown with a resolution selection component 616. The resolution selection component 616 may select the resolutions of the images 610 that are captured by the image capture component 604. The resolution selection component 616 may select the resolutions of the captured images 610 by evaluating predefined resolution selection rules 622 based on the brightness information 618 that is provided by the brightness determination component 620, and also based on the information 646 about the intended brightness that is provided by the image capture component 604. The resolution selection rules 622 may define how the resolutions of the captured images 610 are selected based on the brightness information 618 about the captured images 610, and also based on the information 646 about the intended brightness of the captured images 610. The resolution selection component 616 may provide resolution commands 624 to the image capture component 604.

Figure 7:
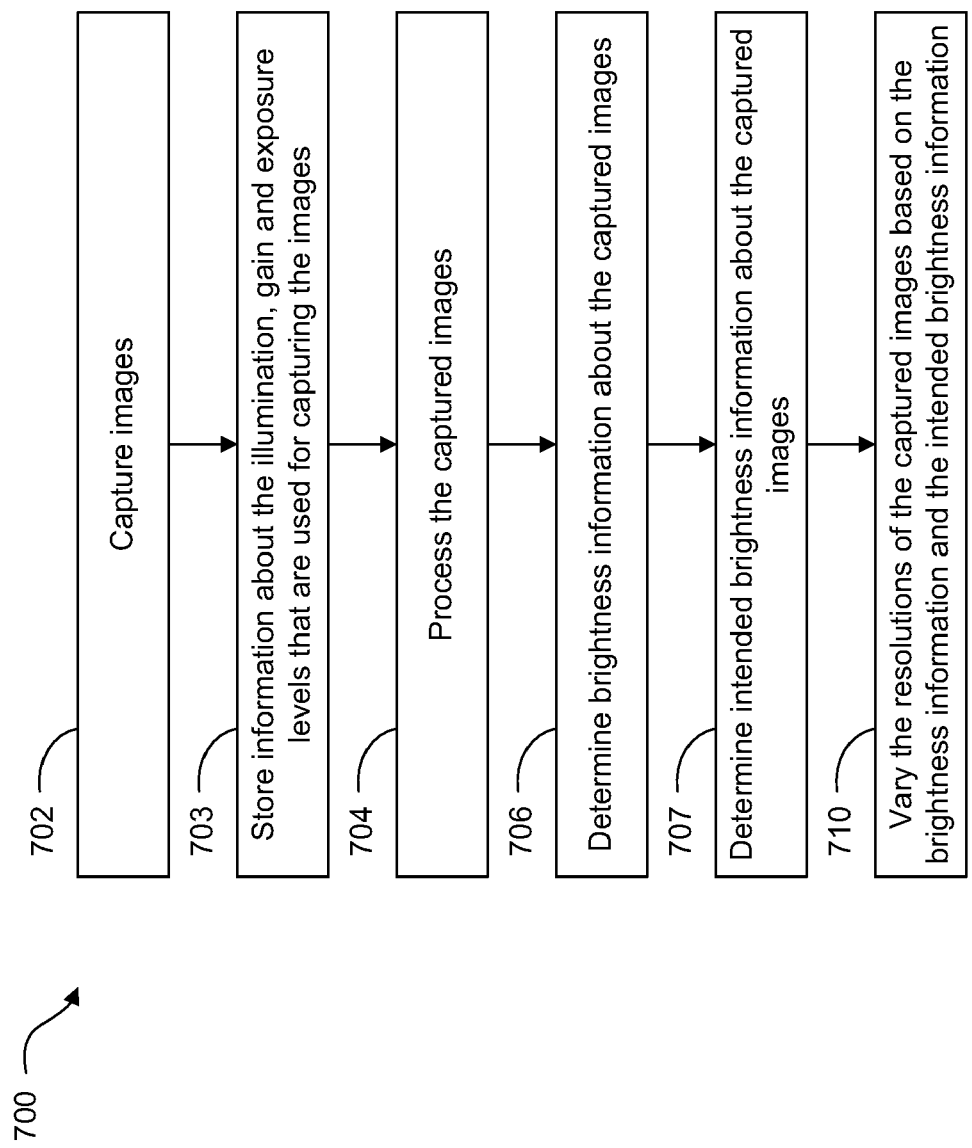
FIG. 7 illustrates a method for adaptively varying the resolutions of captured images that may be implemented by the graphical code reader of FIG. 6.

FIG. 7 illustrates a method 700 for adaptively varying the resolutions of captured images 610. The method 700 may be implemented by the graphical code reader 602 of FIG. 6. The method 700 may include capturing 702 images 610. Information about the illumination levels, gain factors, and exposure times that are used for capturing 702 the images 610 may be stored 703. The method 700 may also include processing 704 the captured images 610. The method 700 may also include determining 706 brightness information 618 about the captured images 610. The method 700 may also include determining 707 information 646 about the intended brightness of the captured images 610. As indicated above, the intended brightness of an image 610 may depend on the illumination level, gain factor, and exposure time that were used for capturing the image 610. For example, the intended brightness may be the product of these factors.

The method 700 may also include varying 710 the resolutions of the captured images 610 based on the brightness information 618 about the captured images 610 and also based on the information 646 about the intended brightness of the captured images 610. The resolutions of the captured images 610 may be varied automatically.

Figure 8:
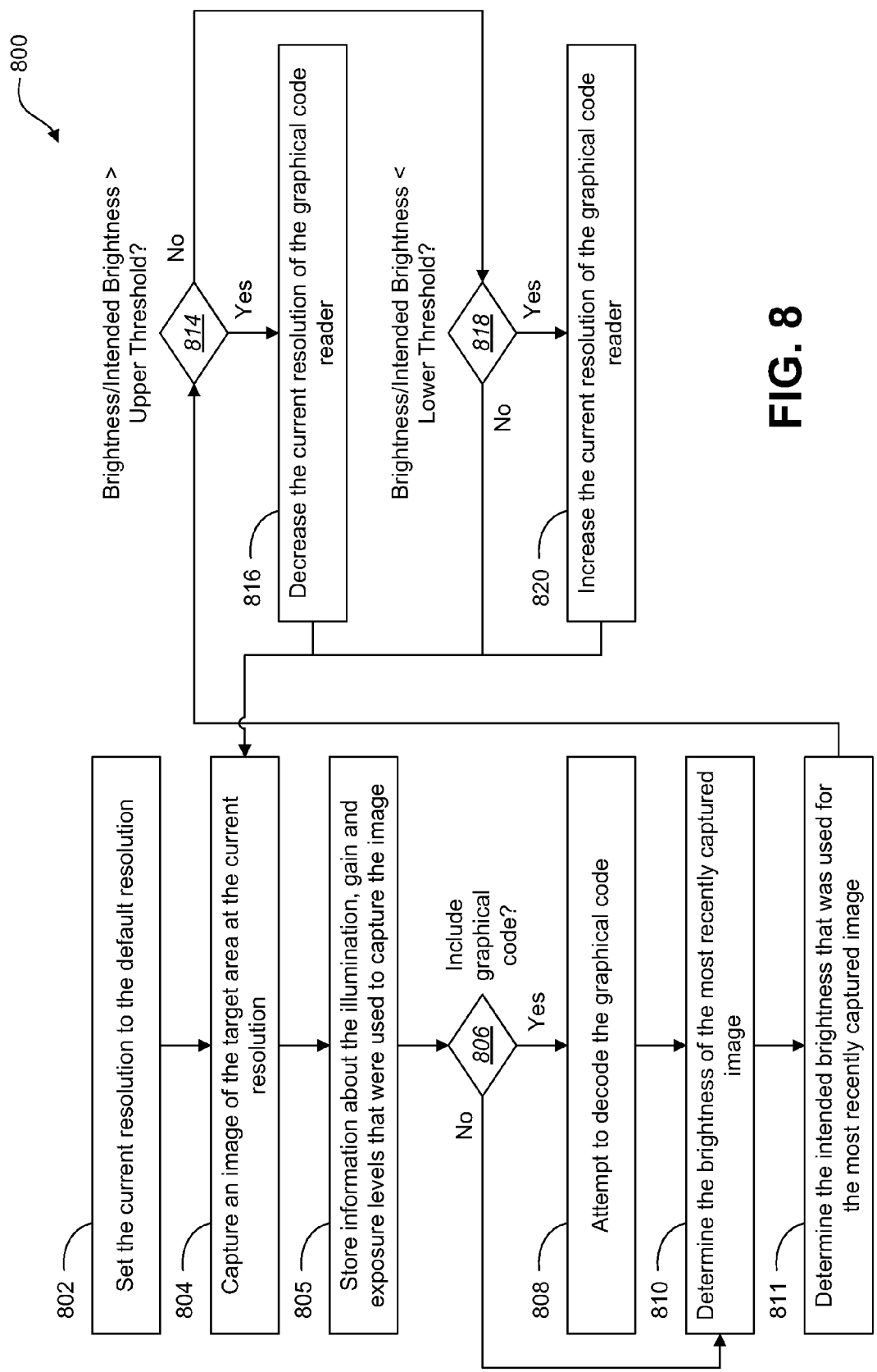
FIG. 8 illustrates another method for adaptively varying the resolutions of captured images that may be implemented by the graphical code reader of FIG. 6.

FIG. 8 illustrates another method 800 for adaptively varying the resolutions of captured images 610. The method 800 shown in FIG. 8 is an example of an implementation of the method 700 shown in FIG. 7. The method 800 may be implemented by the graphical code reader 602 of FIG. 6. The method 800 may be implemented in response to user input to read a graphical code 608.

The method 800 may include setting 802 the current resolution of the graphical code reader 602 to the default resolution. The method 800 may also include capturing 804 an image 610 of the target area 606 at the current resolution. The method 800 may also include storing 805 information about the illumination, gain and exposure levels that were used to capture the image 610. The method 800 may also include determining 806 whether the captured image 610 includes a graphical code 608. If it is determined 806 that the captured image 610 includes a graphical code 608, then the method 800 may also include attempting 808 to decode the graphical code 608.

The method 800 may also include determining 810 the brightness of the most recently captured image 610. The method 800 may also include determining 811 the intended brightness that was used for the most recently captured image 610. As indicated above, the intended brightness of an image 610 may depend on the illumination level, gain factor, and exposure time that were used for capturing the image 610. For example, the intended brightness may be the product of these factors.

The method 800 may then include comparing the brightness of the most recently captured image 610 relative to the intended brightness of the most recently captured image 610 to an upper threshold. If it is determined 814 that the brightness relative to the intended brightness exceeds the upper threshold, this may be interpreted to mean that the graphical code reader 602 is positioned near the graphical code 608. As indicated above, the amount of resolution that a graphical code reader 602 requires to read a graphical code 608 may be inversely proportional to the distance between the graphical code reader 602 and the graphical code 608. Thus, in response to determining 814 that the brightness relative to the intended brightness exceeds the upper threshold, the method 800 may include decreasing 816 the current resolution of the graphical code reader 602. The resolution of the graphical code reader 602 may be decreased to the lowest possible resolution at which the graphical code reader 602 is capable of capturing images 610. Alternatively, the resolution of the graphical code reader 602 may be decreased to a resolution that is not the lowest possible resolution at which the graphical code reader 602 is capable of capturing images 610, but that is still lower than the current resolution. If the current resolution of the graphical code reader 602 is already the lowest possible resolution at which the graphical code reader 602 is capable of capturing images 610, then the resolution may remain unchanged. The method 800 may then return to capturing 804 an image 610 of the target area 606 at the current resolution. The method 800 may then proceed as described above.

If it is determined 814 that the brightness relative to the intended brightness does not exceed the upper threshold, then the method 800 may include determining 818 whether the brightness of the most recently captured image 610 relative to the intended brightness is less than a lower threshold. If it is determined 818 that the brightness relative to the intended brightness is less than the lower threshold, this may be interpreted to mean that the graphical code reader 602 is positioned relatively far away from the graphical code 608. Thus, in response to determining 818 that the brightness relative to the intended brightness is less than the lower threshold, the method 800 may include increasing 820 the current resolution of the graphical code reader 602. The resolution of the graphical code reader 602 may be increased to the highest possible resolution at which the graphical code reader 602 is capable of capturing images 610. Alternatively, the resolution of the graphical code reader 602 may be increased to a resolution that is not the highest possible resolution at which the graphical code reader 602 is capable of capturing images 610, but that is still higher than the current resolution. If the current resolution of the graphical code reader 602 is already the highest possible resolution at which the graphical code reader 602 is capable of capturing images 610, then the resolution may remain unchanged. The method 800 may then return to capturing 804 an image 610 of the target area 606 at the current resolution. The method 800 may then proceed as described above.

If it is determined 818 that the brightness relative to the intended brightness is not less than the lower threshold, then the method 800 may return to capturing 804 an image 610 of the target area 606 at the current resolution without changing the current resolution. In other words, the next image 610 may be captured at the same resolution as the most recently captured image 610.

Figure 9:
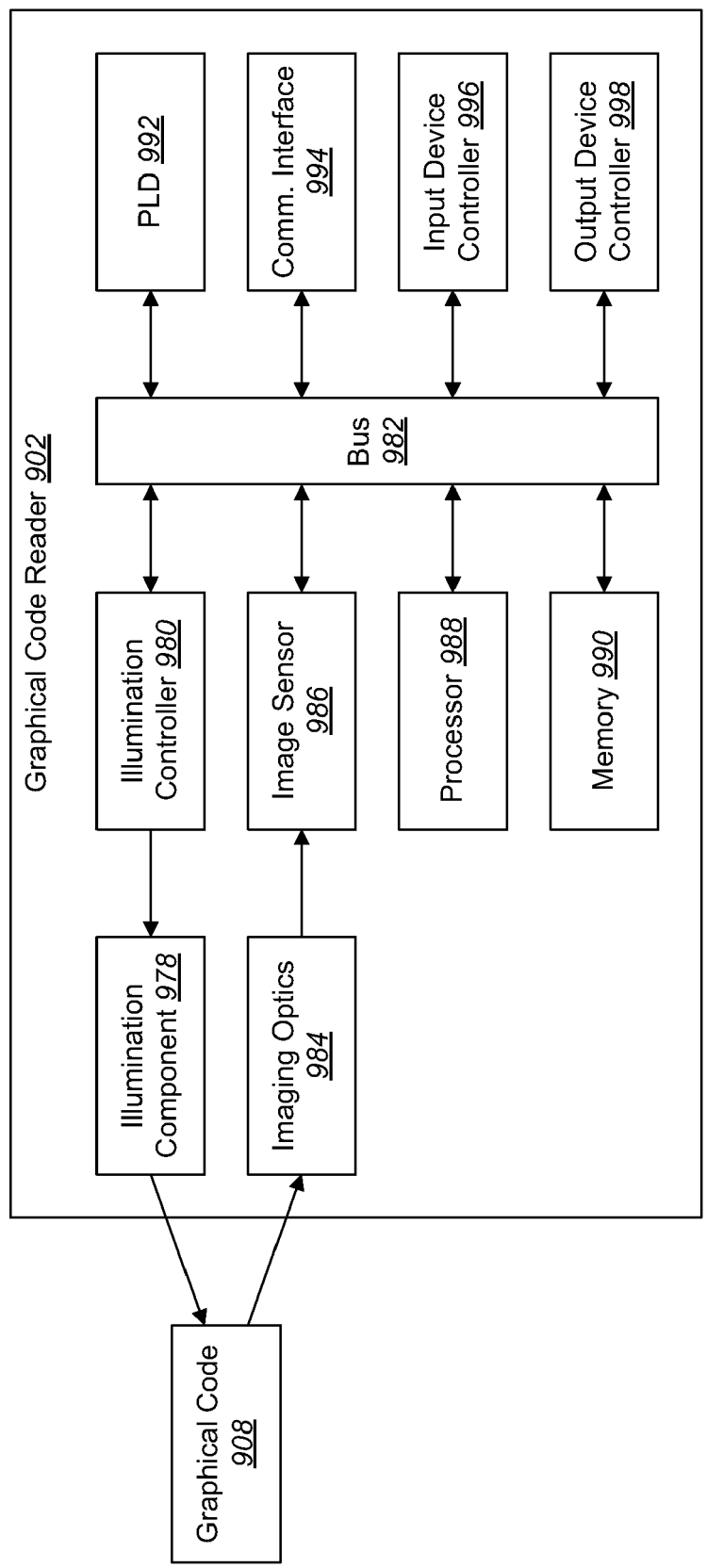
FIG. 9 illustrates components that may be included in a graphical code reader.

FIG. 9 illustrates components that may be included in a graphical code reader 902. The graphical code reader 902 is shown with an illumination component 978. The illumination component 978 may include a plurality of illumination elements that may be activated to illuminate a graphical code 908. The illumination component 978 may be controlled by an illumination controller 980, which may be in electronic communication with other components in the graphical code reader 902 via a system bus 982.

The graphical code reader 902 may also include imaging optics 984 and an image sensor 986. The image sensor 986 may include a plurality of light-sensitive elements. The imaging optics 984 may focus light reflected from the area illuminated by the illumination component 978 onto the image sensor 986. Examples of image sensors 986 include charge coupled devices (CCDs) and complementary metal-oxide semiconductor (CMOS) sensors. A housing (not shown) may be provided for shielding the light-sensitive elements in the image sensor 986 from ambient light. The image sensor 986 may be in electronic communication with other components in the graphical code reader 902 via the system bus 982.

The graphical code reader 902 is also shown with a processor 988 and memory 990. The processor 988 may control the operation of the graphical code reader 902 and may be embodied as a microprocessor, a microcontroller, a digital signal processor (DSP), etc. The processor 988 may perform logical and arithmetic operations based on program instructions stored within the memory 990.

As used herein, the term "memory" 990 may be broadly defined as any electronic component capable of storing electronic information, and may be embodied as read only memory (ROM), random access memory (RAM), magnetic disk storage media, optical storage media, flash memory devices in RAM, on-board memory included with the processor 988, EPROM memory, EEPROM memory, registers, etc. The memory 990 may store program instructions and other types of data. The program instructions may be executed by the processor 988 to implement some or all of the methods disclosed herein. The processor 988 and memory 990 may be in electronic communication with other components in the graphical code reader 902 via the system bus 982.

The graphical code reader 902 may also include one or more programmable logic devices (PLDs) 992. The PLDs 992 may be programmed to carry out logic functions that implement, either partially or completely, some or all of the methods disclosed herein. Examples of different types of PLDs 992 that may be used include field-programmable gate arrays (FPGAs), logic-cell arrays (LCAs), programmed arrays of logic (PALs), complex programmable-logic devices (CPLDs), and so forth. The PLDs 992 may be in electronic communication with other components in the graphical code reader 902 via the system bus 982. One or more application-specific integrated circuits (ASICs) may be used in place of or in addition to the PLDs 992.

The graphical code reader 902 is also shown with a communication interface 994 for communicating with other electronic devices. The communication interface 994 may be based on wired communication technology, wireless communication technology, etc. Examples of different types of communication interfaces 994 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth. The communication interface 994 may be in electronic communication with other components in the graphical code reader 902 via the system bus 982.

The graphical code reader 902 is also shown with an input device controller 996 for controlling input devices, such as keys, buttons, etc. The graphical code reader 902 is also shown with an output device controller 998 for controlling output devices, such as a display screen. The input device controller 996 and output device controller 998 may be in electronic communication with other components in the graphical code reader 902 via the system bus 982.

As used herein, the term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limiting the scope of the claims.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. A method for adaptively varying resolutions of captured images, the method being performed by a graphical code reader, the method comprising:

capturing images; and varying the resolutions at which the images are captured based on brightness information that is determined about the captured images;

wherein varying the resolutions at which the images are captured based on the brightness information comprises decreasing the number of pixels that are included in a next captured image relative to the number of pixels that were included in a most recently captured image if the brightness of the most recently captured image exceeds an upper threshold; and wherein varying the resolutions at which the images are captured based on the brightness information also comprises increasing the number of pixels that are included in the next captured image relative to the number of pixels that were included in the most recently captured image if the brightness of the most recently captured image is less than a lower threshold.

2. The method of claim 1, wherein the images have substantially a same field of view.

3. The method of claim 1, wherein the resolutions at which the images are captured are varied automatically.

4. The method of claim 1, wherein varying the resolutions at which the images are captured comprises evaluating predefined resolution selection rules based on the brightness information.

5. A method for adaptively varying resolutions of captured images, the method being performed by a graphical code reader, the method comprising:

capturing images; and varying the resolutions at which the images are captured based on brightness information and intended brightness information that is determined about the captured images;

wherein varying the resolutions at which the images are captured based on the brightness information and the intended brightness information comprises decreasing the number of pixels that are included in the next captured image relative to the number of pixels that were included in the most recently captured image if the brightness of the most recently captured image relative to an intended brightness that was used for the most recently captured image exceeds an upper threshold.

6. A method for adaptively varying resolutions of captured images, the method being performed by a graphical code reader, the method comprising:

capturing images; and varying the resolutions at which the images are captured based on brightness information and intended brightness information that is determined about the captured images;

wherein varying the resolutions at which the images are captured based on the brightness information and the intended brightness information comprises increasing the number of pixels that are included in the next captured image relative to the number of pixels that were included in the most recently captured image if the brightness of the most recently captured image relative to an intended brightness that was used for the most recently captured image is less than a lower threshold.

7. A graphical code reader that is configured to:

capture images; and vary the resolutions at which the images are captured based on brightness information that is determined about the captured images;

wherein varying the resolutions at which the images are captured based on the brightness information comprises decreasing the number of pixels that are included in a next captured image relative to the number of pixels that were included in a most recently captured image if the brightness of the most recently captured image exceeds an upper threshold; and wherein varying the resolutions at which the images are captured based on the brightness information also comprises increasing the number of pixels that are included in the next captured image relative to the number of pixels that were included in the most recently captured image if the brightness of the most recently captured image is less than a lower threshold.

8. The graphical code reader of claim 7, wherein the images have substantially a same field of view.

9. The graphical code reader of claim 7, wherein the resolutions at which the images are captured are varied automatically.

10. The graphical code reader of claim 7, wherein varying the resolutions at which the images are captured comprises evaluating predefined resolution selection rules based on the brightness information.

11. A graphical code reader that is configured to:

capture images; and vary the resolutions at which the images are captured based on brightness information and intended brightness information that is determined about the captured images;

wherein varying the resolutions at which the images are captured based on the brightness information and the intended brightness information comprises decreasing the number of pixels that are included in the next captured image relative to the number of pixels that were included in the most recently captured image if the brightness of the most recently captured image relative to an intended brightness that was used for the most recently captured image exceeds an upper threshold.

12. A graphical code reader that is configured to:

capture images; and vary the resolutions at which the images are captured based on brightness information and intended brightness information that is determined about the captured images;

wherein varying the resolutions at which the images are captured based on the brightness information and the intended brightness information comprises increasing the number of pixels that are included in the next captured image relative to the number of pixels that were included in the most recently captured image if the brightness of the most recently captured image relative to an intended brightness that was used for the most recently captured image is less than a lower threshold.

* * * * *